United States Patent
Komori

(10) Patent No.: US 12,225,487 B2
(45) Date of Patent: Feb. 11, 2025

(54) COMMUNICATION DEVICE, COMMUNICATION SYSTEM, AND RECORDING MEDIUM

(71) Applicant: Mitsubishi Electric Corporation, Tokyo (JP)

(72) Inventor: Hiroshi Komori, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 381 days.

(21) Appl. No.: 17/795,240

(22) PCT Filed: Mar. 30, 2020

(86) PCT No.: PCT/JP2020/014639
§ 371 (c)(1),
(2) Date: Jul. 26, 2022

(87) PCT Pub. No.: WO2021/199191
PCT Pub. Date: Oct. 7, 2021

(65) Prior Publication Data
US 2023/0067697 A1 Mar. 2, 2023

(51) Int. Cl.
*H04W 56/00* (2009.01)
*H04W 24/10* (2009.01)

(52) U.S. Cl.
CPC ......... *H04W 56/003* (2013.01); *H04W 24/10* (2013.01)

(58) Field of Classification Search
CPC ............................ H04W 56/003; H04W 24/10
USPC ........................................................ 370/503
See application file for complete search history.

(56) References Cited

U.S. PATENT DOCUMENTS

| 2013/0336303 A1 | 12/2013 | Omeni | |
|---|---|---|---|
| 2017/0063701 A1* | 3/2017 | Morioka | H04L 43/16 |
| 2021/0001793 A1* | 1/2021 | Ujiie | H04L 12/40084 |

FOREIGN PATENT DOCUMENTS

| JP | 2010-56938 A | 3/2010 |
|---|---|---|
| JP | 2014-504485 A | 2/2014 |
| JP | 2017-142740 A | 8/2017 |

OTHER PUBLICATIONS

International Search Report and Written Opinion mailed on Aug. 4, 2020, received for PCT Application PCT/JP2020/014639, filed on Mar. 30, 2020, 8 pages including English Translation.

* cited by examiner

Primary Examiner — Faisal Choudhury
(74) Attorney, Agent, or Firm — XSENSUS LLP

(57) ABSTRACT

A communication device (10) communicates with a communication device (20) in each of time divisions defined by shared time that is shared with the communication device (20). The communication device (10) includes a clocking unit (11) that measures the shared time, an acquirer (13) that acquires, from the communication device (20), error information about a first error of the communication device (20) in measuring the shared time, and a specifier (14) that specifies, to the communication device (20), a suspension duration at least at a start or at an end of each of the time divisions. The suspension duration is a duration for which the communication device (20) suspends data transmission. The suspension duration specified by the specifier (14) is greater than or equal to a greater error of the first error and a second error that is an error of the clocking unit (11) in time measurement.

9 Claims, 16 Drawing Sheets

FIG.11

| GREATEST ERROR (MICROSECOND) | SUSPENSION DURATION (MICROSECOND) |
|---|---|
| ≤ 10 | 12 |
| ≤ 11 | 13 |
| ≤ 12 | 14 |
| ≤ 13 | 15 |
| ⋮ | ⋮ |

COMMUNICATION DEVICE, COMMUNICATION SYSTEM, AND RECORDING MEDIUM

CROSS-REFERENCE TO RELATED APPLICATION

The present application is based on PCT filing PCT/JP2020/014639, filed Mar. 30, 2020, the entire contents of which are incorporated herein by reference.

TECHNICAL FIELD

The present disclosure relates to a communication device, a communication system, a communication method, and a program.

BACKGROUND ART

Facilities such as factories operate using a system controlling multiple devices. A technique developed for such a system allows the multiple devices to accurately operate in cooperation with one another (see, for example, Patent Literature 1).

Patent Literature 1 describes a coordination instruction device. The coordination instruction device premeasures a communication delivery time taken to communicate with multiple devices, predetermines the accuracy of the clock counters of the multiple devices, and transmits, to each device, an execution signal that specifies a clock to operate based on the communication delivery time and the accuracy of the clock counter. The coordination instruction device coordinates the multiple devices with less errors.

CITATION LIST

Patent Literature

Patent Literature 1: Unexamined Japanese Patent Application Publication No. 2017-142740

SUMMARY OF INVENTION

Technical Problem

The technique in Patent Literature 1 allows the multiple devices to operate in coordination with one another without being based on absolute time common to the devices. However, to perform real-time processing at some factory automation (FA) sites, the times measured by the respective devices are synchronized before communications performed in predetermined cycles. With this communication method, the multiple devices using common data are to transmit and receive the data in common cycles. However, synchronization between the devices may involve a certain degree of deviation. The deviation may cause data transmitted in one cycle in accordance with the time measured by one device to be received in another cycle in accordance with the time measured by another device. To avoid this, each cycle includes a duration for which the devices are disabled from transmitting data.

For the devices with the same synchronization accuracy, the communication efficiency may be retained by minimizing the transmission-disabled duration determined in accordance with a possible deviation. However, the synchronization accuracy may differ between devices connected to a FA network, and some devices may have different degrees of synchronization accuracy. In that system, the synchronization accuracy of the devices is to be examined one by one, and an optimal duration is to be set with each device. This causes an operator to perform complicated setting operations.

In response to the above issue, an objective of the present disclosure is to reduce setting operations performed on devices with different degrees of synchronization accuracy.

Solution to Problem

To achieve the above objective, a communication device according to an aspect of the present disclosure is a communication device for communicating with another device in each of time divisions defined by shared time that is shared with the another device. The communication device includes clocking means for measuring the shared time, acquiring means for acquiring, from the another device, error information about a first error of the another device in measuring the shared time, and specifying means for specifying, to the another device, a suspension duration at least at a start or at an end of each of the time divisions. The suspension duration is a duration for which the another device suspends data transmission. The suspension duration specified by the specifying means is greater than or equal to a greater error of the first error and a second error that is an error of the clocking means in time measurement.

Advantageous Effects of Invention

In the structure according to the above aspect of the present disclosure, the acquiring means acquires error information about a first error of the another device in time measurement, and the specifying means specifies a suspension duration for which the another device suspends data transmission to the another device. The suspension duration specified by the specifying means is greater than or equal to a greater error of the first error and the second error of the clocking means in time measurement. This structure eliminates an operation of an operator examining and setting the synchronization accuracy of the another device, and thus reduces the setting operations on a device with a different degree of synchronization accuracy.

BRIEF DESCRIPTION OF DRAWINGS

FIG. 11 is a diagram of example association information according to Embodiment 2;

DESCRIPTION OF EMBODIMENTS

A communication system 1000 according to one or more embodiments of the present disclosure will now be described in detail with reference to the drawings. Time sharing and synchronization among multiple devices refer to synchronization of clocks included in the respective devices. When the clocks in the respective devices measure the same time and share the measured time with one another, the devices are synchronized.

Embodiment 1

Figure 1:
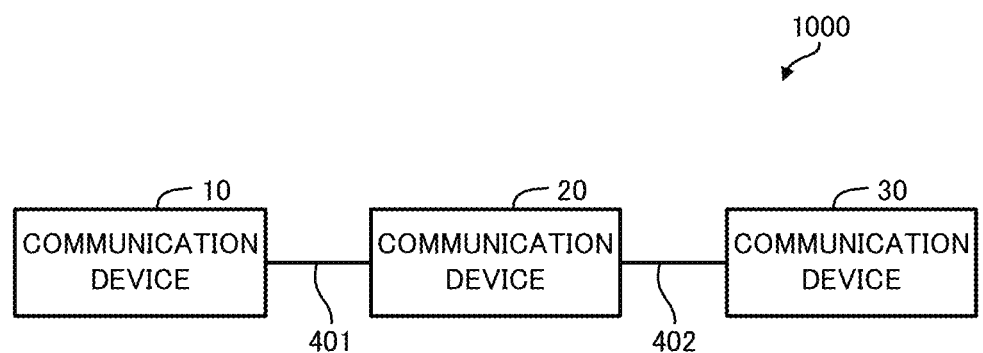
FIG. 1 is a block diagram of a communication system according to Embodiment 1.

The communication system 1000 according to the present embodiment corresponds to a part of a FA system installed in a factory. The communication system 1000 includes devices included in a production system, an inspection system, a processing system, and other systems serving as a FA system connected to each other through communication channels. As shown in FIG. 1, the communication system 1000 includes communication devices 10, 20, and 30.

Each of the communication devices 10, 20, and 30 is, for example, an industrial personal computer (IPC), a programmable logic controller (PLC) as an industrial controller, a unit in a PLC, a network switch, an actuator or a robot controlled by a PLC, a sensor device including a sensor, or another device. In the example described below, the communication device 10 is an IPC, the communication device 20 is a network switch, and the communication device 30 is a PLC.

Figure 2:
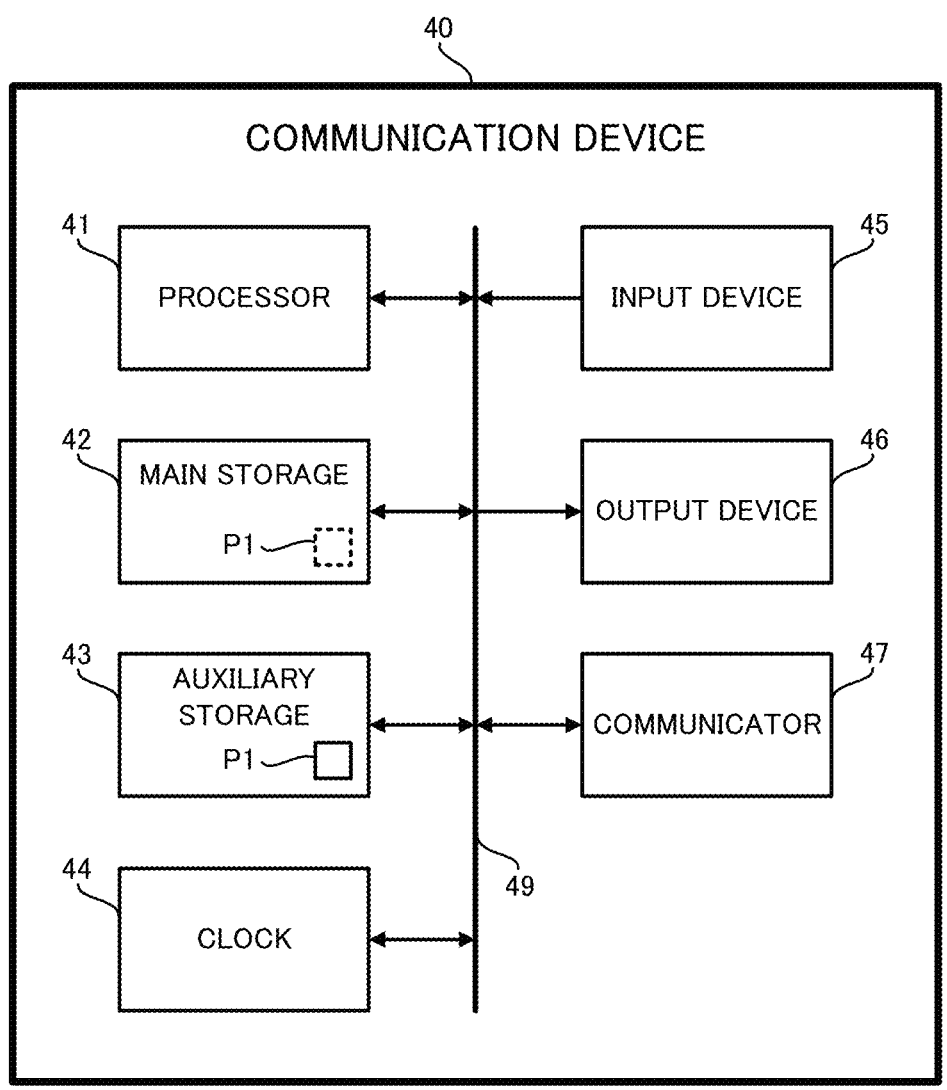
FIG. 2 is a block diagram of a communication device according to Embodiment 1, showing the hardware configuration.

FIG. 2 shows the hardware configuration of the communication devices 10, 20, and 30. Each of the communication devices 10, 20, and 30 is referred to as a communication device 40 as shown in FIG. 2. The communication device 40 includes, as hardware components, a processor 41, a main storage 42, an auxiliary storage 43, a clock 44, an input device 45, an output device 46, and a communicator 47. The main storage 42, the auxiliary storage 43, the clock 44, the input device 45, the output device 46, and the communicator 47 are connected to the processor 41 with an internal bus 49.

The processor 41 includes a central processing unit (CPU). The processor 41 executes a program P1 stored in the auxiliary storage 43 to implement various functions of the communication device 40 and perform the processes described later.

The main storage 42 includes a random-access memory (RAM). The program P1 is loaded on the main storage 42 from the auxiliary storage 43. The main storage 42 is used as a work area for the processor 41.

The auxiliary storage 43 includes a nonvolatile memory such as an electrically erasable programmable read-only memory (EEPROM) and a hard disk drive (HDD). In addition to the program P1, the auxiliary storage 43 stores various items of data used for processes performed by the processor 41. The auxiliary storage 43 provides, in accordance with instructions from the processor 41, data to be used by the processor 41 to the processor 41 and stores data provided from the processor 41.

The clock 44 includes, for example, a clock generator circuit including a quartz resonator, a silicon resonator, a quartz oscillator, or another oscillator circuit. The clock 44 generates a clock signal based on the clock generated by the clock generator circuit, and outputs the clock signal. The clock signal includes a clock pulse, and is used by the processor 41 to measure time by counting the number of times the clock pulse rises using a built-in hardware device or through software processing. The accuracy of time measurement using the clock 44 is determined based on the structures of the processor 41 and the clock 44. Thus, the time measurement accuracy of the communication devices 10, 20, and 30 may vary as described later.

The input device 45 is typically an input key or a pointing device. The input device 45 acquires information input into the communication device 40 by a user, and provides the acquired information to the processor 41.

The output device 46 includes, for example, a liquid crystal display (LCD) or a speaker. The output device 46 provides various items of information to a user in accordance with an instruction from the processor 41.

The communicator 47 includes a network interface circuit for communicating with external devices. The communicator 47 receives external signals and outputs data indicated by these signals to the processor 41. The communicator 47 transmits signals indicating the data output from the processor 41 to the external devices. Although FIG. 2 shows a single communicator 47, the communication device 40 may include communicators 47 for connection to multiple transmission lines.

Referring back to FIG. 1, the communication devices 10 and 20 are connected through an industrial network 401 to communicate with each other. The communication devices 20 and 30 are connected through an industrial network 402 to communicate with each other. Each of the industrial networks 401 and 402 may be a FA network such as a field network or another network. The communication devices 10, 20, and 30 may be connected in a manner other than in the example shown in FIG. 1. For example, the communication devices 20 and 30 may be connected to each other with a dedicated line. The communication devices 10, 20, and 30 may be connected with a single network.

The communication device 40 is synchronized through the industrial networks 401 and 402. More specifically, each of the communication devices 10, 20, and 30 shares time with the other devices in accordance with a synchronous protocol. The synchronous protocol is used to synchronize the devices on a communication network accurately. For example, when IEEE802.1AS is used as the synchronous protocol, a grand master corresponding to one node on the network periodically distributes an accurate reference clock through the communication network. When data is transmitted and returned back between the grand master and a slave corresponding to another node, a communication delay is measured. The slave acquires a reference clock resulting from correction of the communication delay. Thus, the time with the communication delay being corrected is shared. The time shared between the devices is hereafter referred to as shared time.

Figure 3:
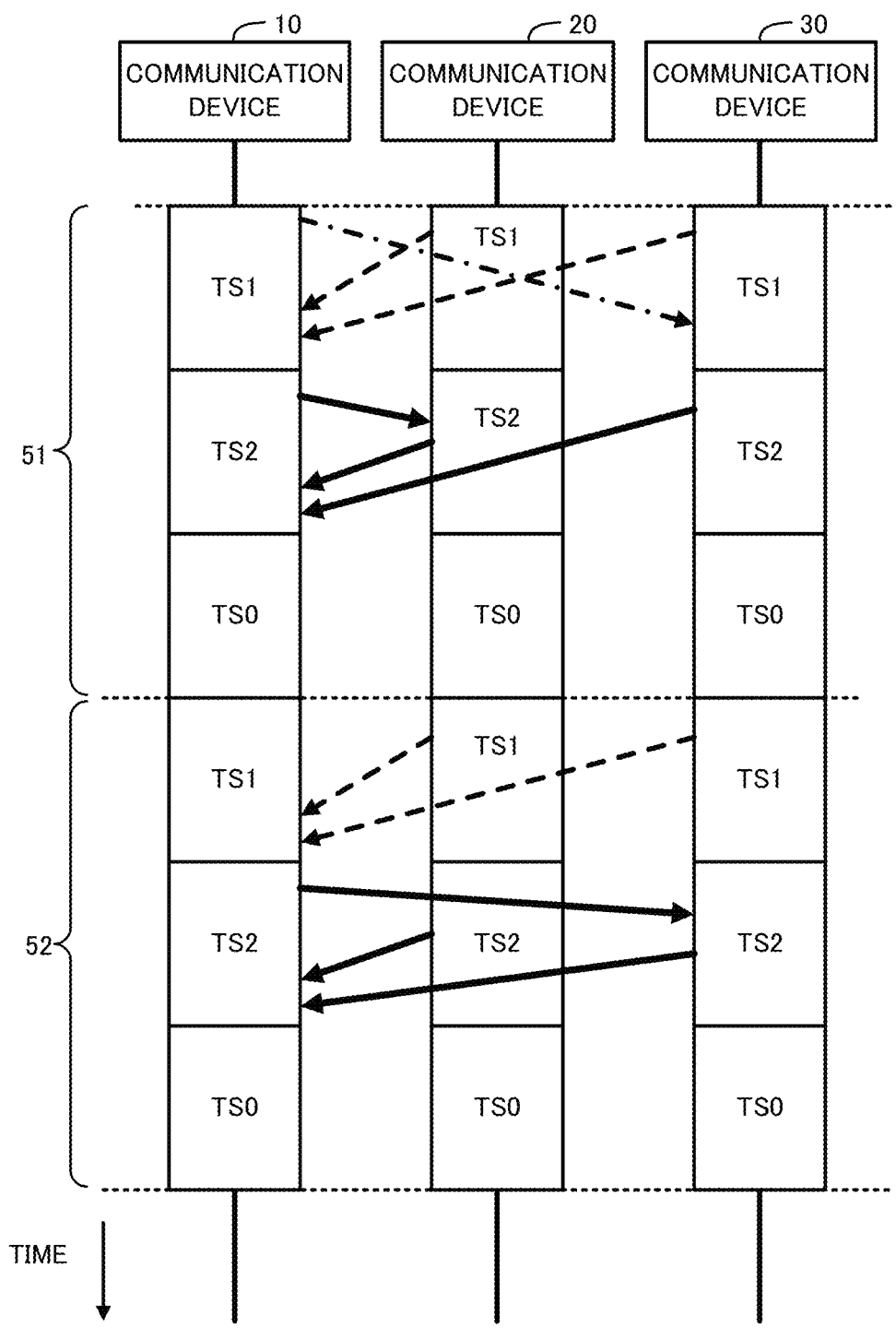
FIG. 3 is a diagram describing first communications in each time division performed in the communication system according to Embodiment 1.

The communication device 40 performs communications in accordance with a communication protocol for transmitting or receiving data in accordance with the shared time and based on a predetermined schedule. The communication protocol is, for example, IEEE802.1Qbv used with a time sensitive network (TSN) technique. More specifically, as shown in FIG. 3, the communication devices 10, 20, and 30 communicate by time division multiplexing in each of time divisions 51 and 52 with a length predetermined in accordance with the shared time.

The time divisions 51 and 52 are adjacent to each other. In other words, the time division 52 follows the time division 51, and the end time of the time division 51 coincides with the start time of the time division 52. Although FIG. 3 shows the two time divisions 51 and 52, time divisions substantially the same as the time divisions 51 and 52 are defined before the time division 51 and after the time division 52. The time divisions 51 and 52 each include time slots TS1, TS2, and TS0.

The time slots TS0 to TS2 are set for performing two-way communications in predetermined different modes, channels, or protocols. For example, in the time slot TS1, data for synchronization in accordance with the synchronous protocol is transmitted. In the time slot TS2, data for the cyclic communication is transmitted. In the time slot TS0, another communication such as Internet Protocol (IP) communication may be performed. In another example, the time slot TS0 may be allocated with no communication and may be expandable in the future. In FIG. 3, data transmission in the time slot TS1 is indicated with broken arrows, and data transmission in the time slot TS2 is indicated with solid arrows. The time divisions 51 and 52 have an equal length, and thus the communication in each time slot is performed in cycles.

In a cyclic communication, communications for storing data common to the memories of the devices are performed in cycles to synchronize data stored in each memory in each consecutive cycles. In this case, each piece of information transmitted between the devices is assigned with a cycle number to distinguish the cycle in which the data is synchronized based on the information from other cycles.

In the same manner as in such a cyclic communication, each of the time divisions 51 and 52 is assigned with a cycle number in the communications performed by the communication device 40 to distinguish the time divisions 51 and 52 from at least adjacent time divisions. More specifically, data transmitted in each of the time divisions 51 and 52 includes information indicating the cycle number. The communications in the time divisions 51 and 52 are distinguished from the communications in other time divisions to allow real-time processing.

Figure 4:
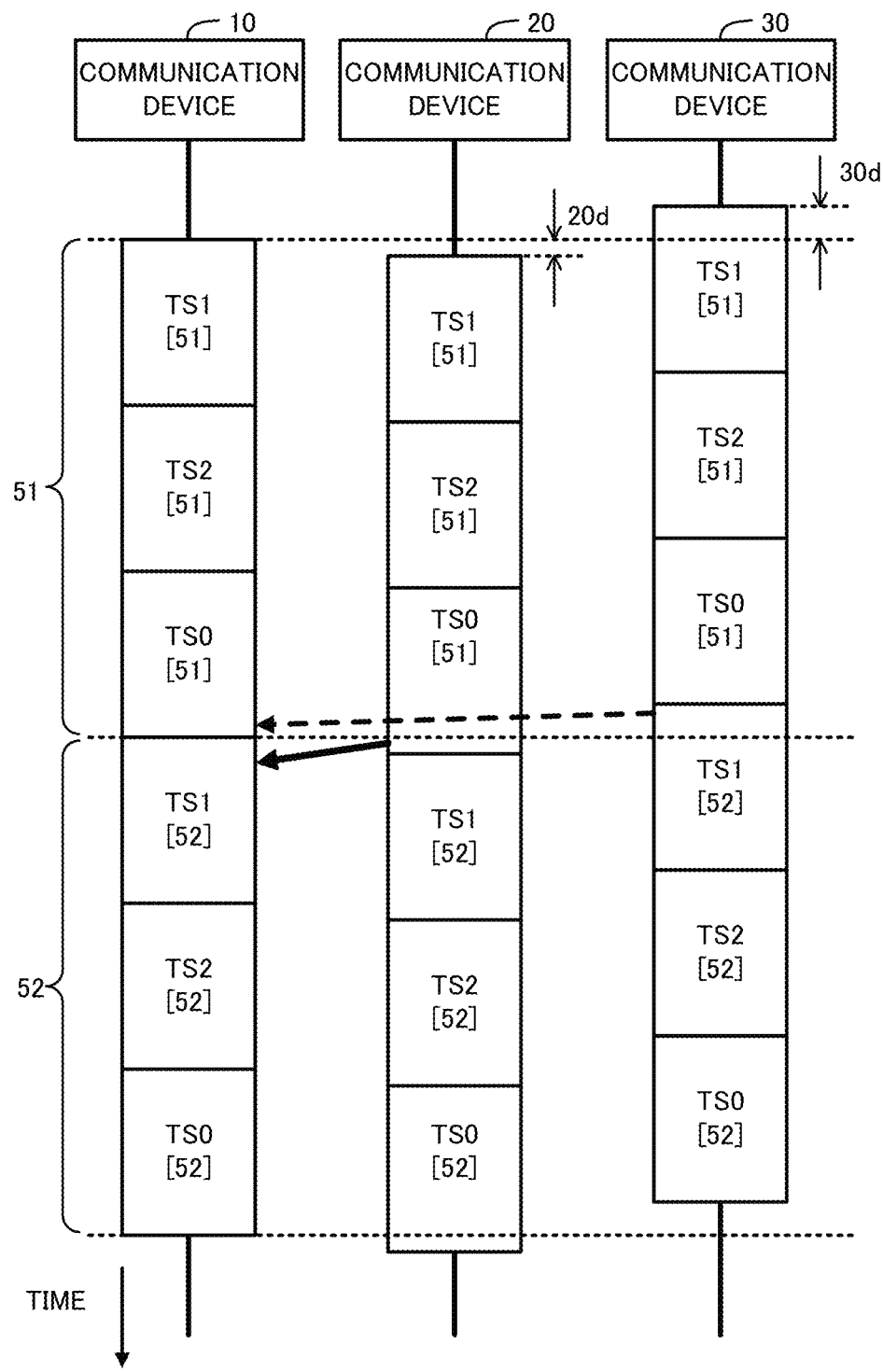
FIG. 4 is a diagram describing second communications in each time division performed in the communication system according to Embodiment 1.

In other words, data transmitted in one time division and received in another time division is determined as a communication abnormality, and this data is excluded from a normal process. For example, as indicated with a broken arrow in FIG. 4, when data transmitted from the communication device 30 in the time division 52 is received by the communication device 10 in the time division 51, the data is discarded without being processed. As indicated with a solid arrow in FIG. 4, when data transmitted from the communication device 20 in the time division 51 is received by the communication device 10 in the time division 52, the data is discarded. In FIG. 4, the blocks representing the time slots TS0 to TS2 are denoted with the reference signs of the time divisions including the time slots. For example, the blocks representing the time slots TS1 included in the time division 51 are denoted with TS1[51].

The communication abnormality as shown in FIG. 4 may occur when the shared time measured by the communication device 40 contains a deviation. When each communication device 40 measures time with dedicated hardware such as an application-specific integrated circuit (ASIC), the synchronization is accurate, and the shared time contains a less deviation. In contrast, when the communication device 40 measures time through software processing, the synchronization is not accurate, and the shared time contains a greater deviation. In the example in FIG. 4, the time measured by the communication device 20 is delayed by a deviation 20d from the time measured by the communication device 10, and the time measured by the communication device 30 precedes the time measured by the communication device 10 by a deviation 30d.

Figure 5:
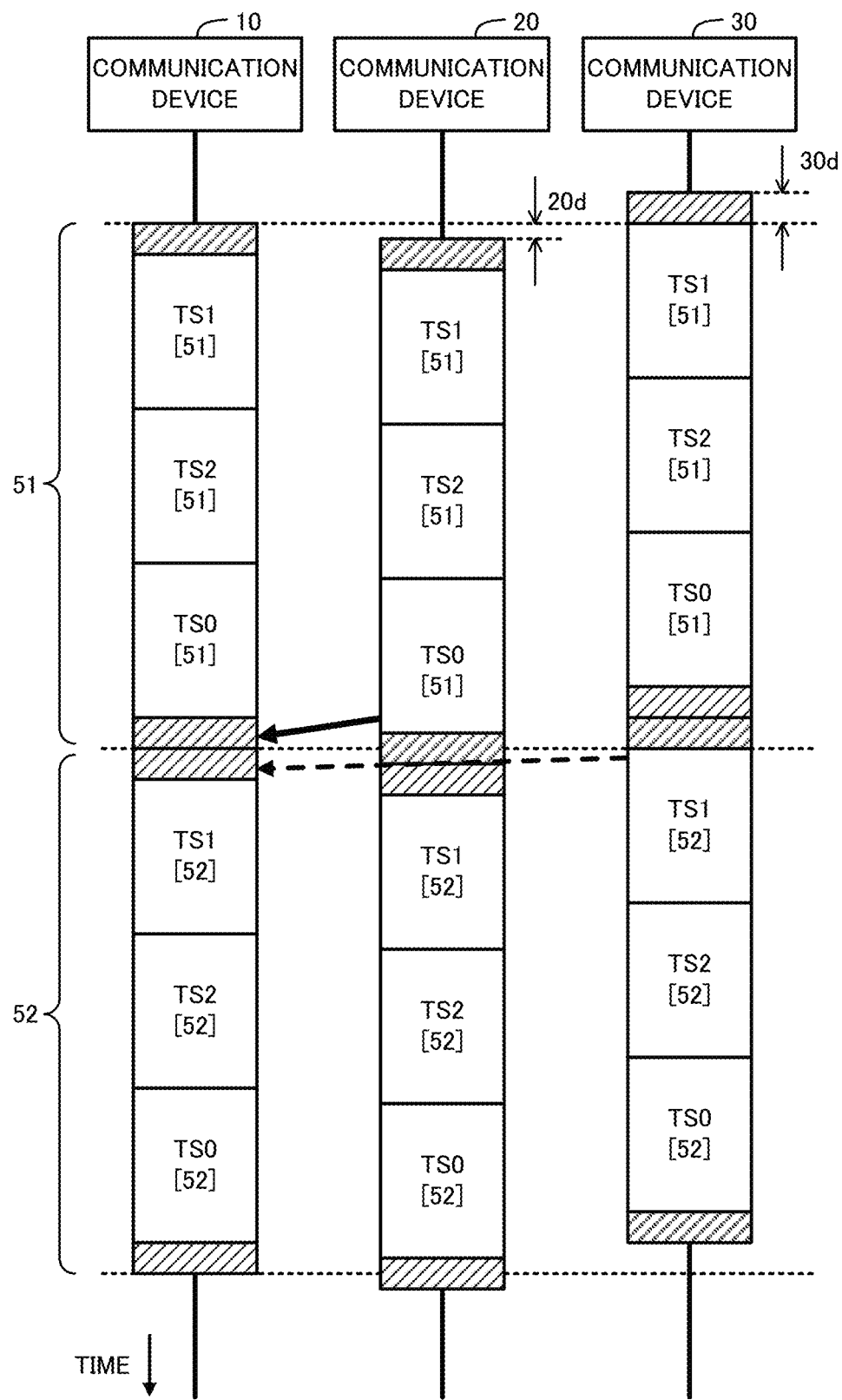
FIG. 5 is a diagram describing third communications in each time division performed in the communication system according to Embodiment 1.

To avoid such a communication abnormality, as indicated with hatched blocks in FIG. 5, the time divisions 51 and 52 have suspension durations during which the communication devices 10, 20, and 30 suspend data transmission at the start and at the end of each division. In the suspension duration, each device is disabled from transmitting data but is allowed to receive data. As shown in FIG. 5, although the deviations 20d and 30d occur as in FIG. 4, data transmitted from the communication device 30 in the time division 52 is normally received by the communication device 10 in the time division 52 and processed. Similarly, data transmitted from the communication device 20 in the time division 51 is normally received by the communication device 10 in the time division 51 and processed. The suspension duration at the start of each of the time divisions 51 and 52 may be a part of the time slot TS1 but may be set before the time slot TS1 separately from the time slot TS1. The suspension duration at the end of each of the time divisions 51 and 52 may be a part of the time slot TS0 but may be set after the time slot TS0 separately from the time slot TS0.

The suspension duration is greater than or equal to the maximum value of the errors in the shared time measured by the communication devices 40. For example, the communication device 10 has a shared-time synchronization accuracy of ±2 microseconds, the communication device 20 has a shared-time synchronization accuracy of ±5 microseconds, and the communication device 30 has a shared-time synchronization accuracy of ±20 microseconds. In this case, the suspension duration is set greater than or equal to 20 microseconds. The synchronization accuracy indicates an error in time measurement. More specifically, the synchronization accuracy may be determined to accommodate a maximum error in time measurement, may be a standard deviation defining a confidence interval of 1σ in a normal distribution, or may be indicated with another type of error.

Figure 6:
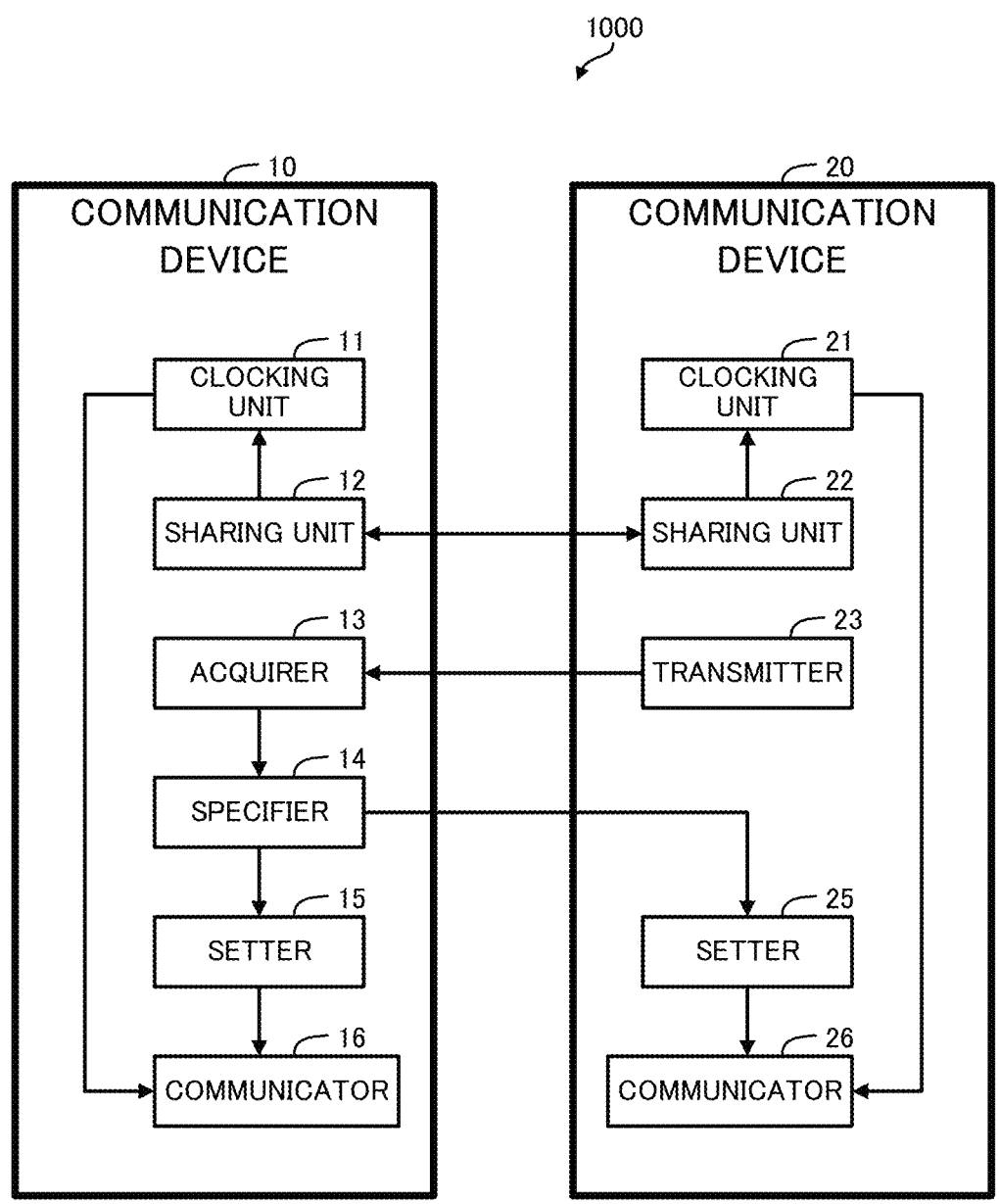
FIG. 6 is a functional block diagram of the communication device according to Embodiment 1.

The functional structure for setting an appropriate suspension duration for the communication device 40 will now be described with reference to FIG. 6. In FIG. 6, the communication device 10 corresponds to a managing device that specifies the suspension duration to the communication devices 20 and 30 serving as the other devices. The communication device 10 also sets an appropriate suspension duration with the communication device 10. FIG. 6 does not show the communication device 30 having the same structure as the communication device 20. In the communication system 1000, the communication devices 20 and 30 each correspond to an example of a first communication device, and the communication device 10 corresponds to an example of a second communication device that communicates with the first communication device in each of time divisions defined by the shared time shared with the first communication device.

The communication device 10 includes, as functional components, a clocking unit 11 that measures shared time, a sharing unit 12 that synchronizes and shares the shared time with the communication devices 20 and 30, an acquirer 13 that acquires error information about errors in the shared time measured by each of the communication devices 20 and 30, a specifier 14 that specifies the suspension durations to the communication devices 20 and 30, a setter 15 that sets the suspension duration, and a communicator 16 that periodically communicates with the communication devices 20 and 30 in a time division including the suspension duration having the set length.

The clocking unit 11 is mainly implemented by the processor 41 and the clock 44 in the communication device 10 operating in cooperation with each other. Upon synchronization of the shared time performed by the sharing unit 12, the clocking unit 11 measuring the time calibrates and equalizes the measuring time to the synchronized shared time. The time measured by the clocking unit 11 is calibrated with the periodically-synchronized shared time, and thus is substantially equal to the shared time. As described above, however, the time measured by the clocking unit 11 may not be the same as the shared time to which the time is to be synchronized, and may contain an error. The clocking unit 11 in the communication device 10 corresponds to an example of clocking means for measuring the shared time.

The sharing unit 12 is mainly implemented by the processor 41 and the communicator 47 in the communication device 10 operating in cooperation with each other. When the sharing unit 12 communicates with the communication devices 20 and 30 in accordance with the above synchronous protocol, the sharing unit 12 synchronizes the shared time with the communication devices 20 and 30 and notifies the clocking unit 11 of the shared time.

The acquirer 13 is mainly implemented by the processor 41 and the communicator 47 in the communication device 10 operating in cooperation with each other. The acquirer 13 requests, from the communication devices 20 and 30, notification including information indicating the synchronization accuracy of the communication devices 20 and 30 in measuring the shared time, and acquires the information from the communication devices 20 and 30. An error of the communication devices 20 and 30 in time measurement is hereafter referred to as a first error as appropriate, and the information acquired by the acquirer 13 is referred to as error information. The acquirer 13 in the communication device 10 corresponds to an example of acquiring means for acquiring, from the communication devices 20 and 30, error information about the first errors of the communication devices 20 and 30 in measuring the shared time. The acquirer 13 transmits the acquired error information to the specifier 14.

The specifier 14 is mainly implemented by the processor 41 and the communicator 47 in the communication device 10 operating in cooperation with each other. The specifier 14 acquires information indicating the first errors of the communication devices 20 and 30 in time measurement based on the error information. The specifier 14 acquires information indicating the error of the clocking unit 11 in time measurement. The error of the clocking unit 11 in time measurement is hereafter referred to as a second error. For example, the specifier 14 acquires, based on the error information, information indicating 2 microseconds that is the synchronization accuracy of the communication device 20 and information indicating 20 microseconds that is the synchronization accuracy of the communication device 30. The specifier 14 also acquires information indicating 5 microseconds that is the synchronization accuracy of the clocking unit 11 preregistered in the auxiliary storage 43 in the communication device 10.

The specifier 14 acquires, based on the first errors and the second error, the suspension duration to be set with the communication device 40. The suspension duration is equal to the greatest error of the first errors indicated by the error information collected by the acquirer 13 and the second error. When the first errors for the communication devices 20 and 30 are 2 and 20 microseconds, and the second error is 5 microseconds, the suspension duration is equal to 20 microseconds that is the greatest error of the errors.

The specifier 14 instructs the setter 15 and setters 25 in the communication devices 20 and 30 to set the suspension duration acquired from the first errors and the second error. The specifier 14 in the communication device 10 corresponds to an example of specifying means for specifying, to the communication devices 20 and 30, the suspension duration for which the communication devices 20 and 30 suspend data transmission at least at the start or at the end of the time division. The suspension duration specified by the specifying means is greater than or equal to the greatest error of the first errors and the second error of the clocking unit 11 in time measurement.

The setter 15 is mainly implemented by the processor 41 in the communication device 10. The setter 15 sets the suspension duration as instructed by the specifier 14. More specifically, the setter 15 registers the suspension duration by storing data indicating the suspension duration included in the instruction from the specifier 14 into a predetermined area of the main storage 42 or the auxiliary storage 43.

The communicator 16 is mainly implemented by the processor 41 and the communicator 47 in the communication device 10 operating in cooperation with each other. As shown in FIGS. 3 to 5, the communicator 16 communicates with the communication devices 20 and 30 in each time division defined by the shared time measured by the clocking unit 11.

The communication device 20 includes, as functional components, a clocking unit 21 that measures the shared time, a sharing unit 22 that synchronizes and shares the shared time with the communication devices 10 and 30, a transmitter 23 that transmits error information to the communication device 10 as requested by the communication device 10, the setter 25 that sets the suspension duration as instructed by the communication device 10, and a communicator 26 that periodically communicates with the communication devices 10 and 30 in a time division including the suspension duration having the set length.

The clocking unit 21 is mainly implemented by the processor 41 and the clock 44 in the communication device 20 operating in cooperation with each other, and has the same structure as the clocking unit 11 in the communication device 10. The sharing unit 22 is mainly implemented by the processor 41 and the communicator 47 in the communication device 20 operating in cooperation with each other, and has the same structure as the sharing unit 12 in the communication device 10. The setter 25 is mainly implemented by the processor 41 in the communication device 20, and has the same structure as the setter 25 in the communication device 10. The setter 25 in the communication device 20 corresponds to an example of setting means for setting the suspension duration specified by the specifying means. The communicator 26 is mainly implemented by the processor 41 and the communicator 47 in the communication device 20 operating in cooperation with each other, and has the same structure as the communicator 16 in the communication device 10.

The transmitter 23 is mainly implemented by the processor 41 and the communicator 47 in the communication device 20 operating in cooperation with each other. When the acquirer 13 in the communication device 10 requests error information, the transmitter 23 reads information indicating the first error preregistered in the auxiliary storage 43 in the communication device 20. The transmitter 23 then generates error information indicating the first error, and transmits the error information to the acquirer 13. The transmitter 23 in the communication device 20 corresponds to an example of transmitting means for transmitting the error information to the second communication device.

Figure 7:
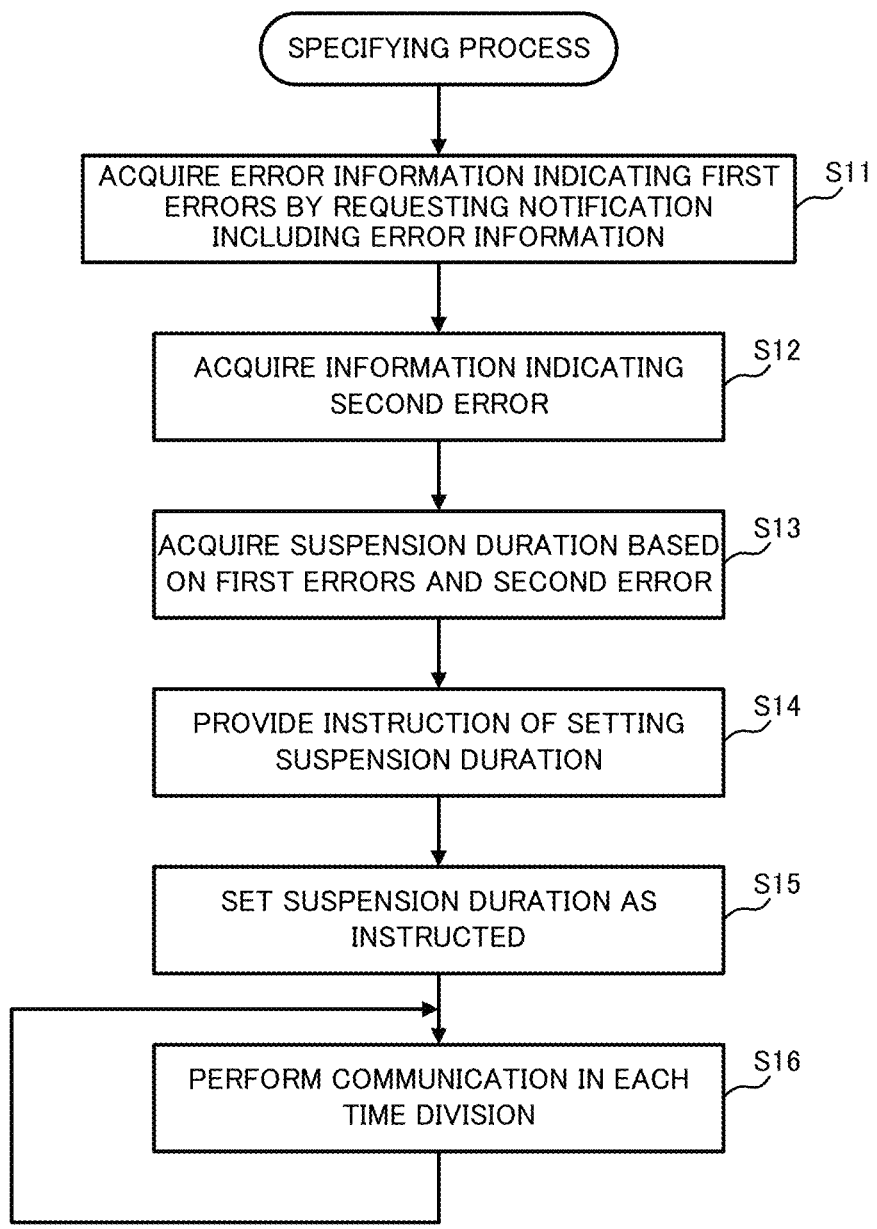
FIG. 7 is a flowchart of a specifying process according to Embodiment 1.

The processes performed by the communication device 40 will now be described with reference to FIGS. 7 and 8. FIG. 7 shows a specifying process performed by the communication device 10. The specifying process is a process for specifying the suspension duration, and is a part of a sequence performed by the communication device 40 to start communications in each time division. In the specifying process, the communication devices 40 transmit information between each other through, for example, IP communication.

In the specifying process, the acquirer 13 requests notification including the error information from the communication devices 20 and 30 to acquire error information indicating the first errors from the communication devices 20 and 30 (step S11). Subsequently, the specifier 14 acquires information indicating the second error (step S12). More specifically, the specifier 14 reads information about the synchronization accuracy of the clocking unit 11 registered in the auxiliary storage 43 in the communication device 10. The specifier 14 may acquire information indicating the second error from another information source. For example, the specifier 14 may acquire information indicating the second error by querying the clocking unit 11 for the synchronization accuracy, or from a server on the Internet by notifying the server of the model number of the communication device 10.

Subsequently, the specifier 14 acquires the suspension duration to be set based on the first errors acquired in step S11 and the second error acquired in step S12 (step S13). More specifically, the specifier 14 specifies the greatest error of the first errors and the second error, and uses the length equal to the specified error as the suspension duration. The specifier 14 may acquire the suspension duration based on the first errors and the second error in another manner. For example, the specifier 14 may calculate the suspension duration by multiplying the greatest error of the first errors and the second error by a safety factor greater than one. When the first errors and the second error correspond to the standard deviation in the normal distribution, the specifier 14 may set the suspension duration to a triple of the greatest error to allow the suspension duration to correspond to the confidence interval of 3σ in the normal distribution. The specifier 14 may set the sum of the greatest error and the second greatest error of the first errors and the second error as the suspension duration.

Subsequently, the specifier 14 instructs the setters 15 and 25 to set the suspension duration acquired in step S13 (step S14). More specifically, the specifier 14 transmits setting commands for specifying the suspension duration to the setters 15 and 25. The setter 15 sets the suspension duration as instructed in step S14 (step S15). In this manner, the communication devices 40 can share the suspension duration to be included in the time divisions 51 and 52 to allow communications between the communication devices 40. The communicator 16 then repeats communications in each of the time divisions 51 and 52 (step S16).

Figure 8:
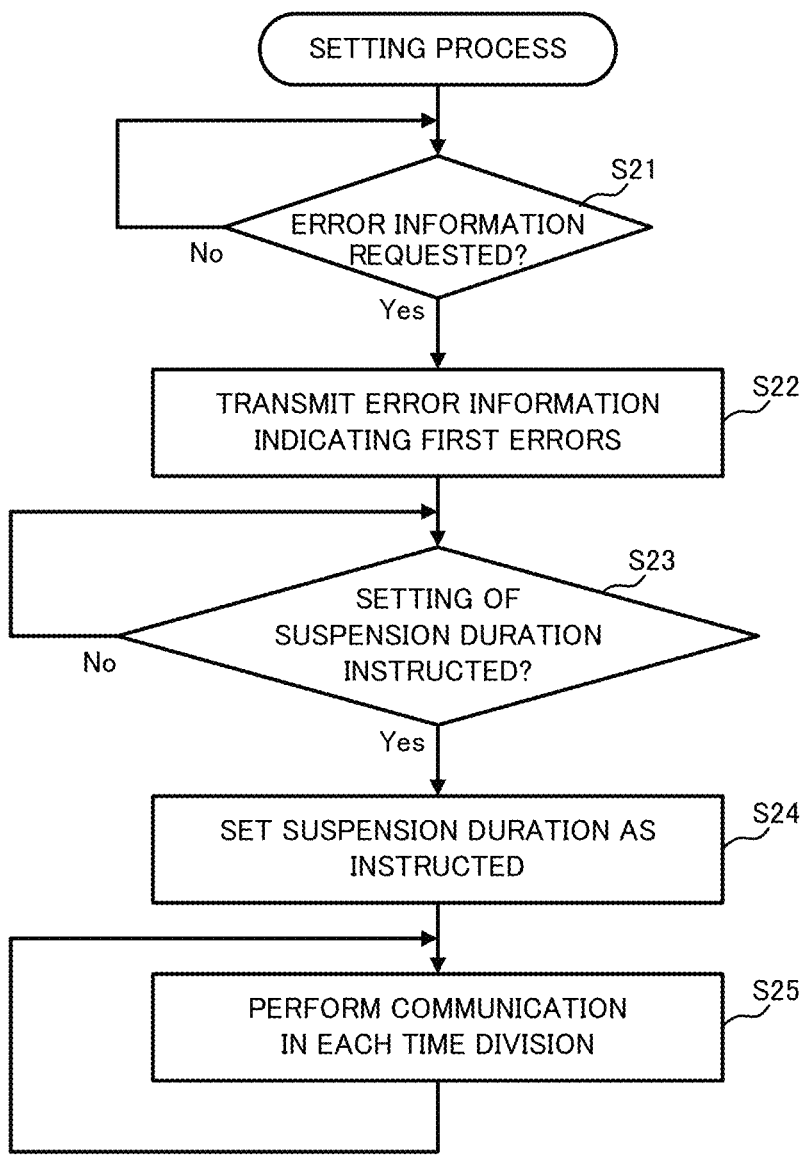
FIG. 8 is a flowchart of a setting process according to Embodiment 1.

FIG. 8 shows a setting process performed by the communication device 20. The setting process is performed in response to the specifying process performed by the communication device 10. The communication device 30 performs the setting process in the same manner as the communication device 20.

In the setting process, the transmitter 23 determines whether error information is requested by the communication device 10 (step S21). When determining that the error information has yet to be requested (No in step S21), the transmitter 23 repeats the determination in step S21, and waits for a request for the error information.

When determining that the error information has been requested (Yes in step S21), the transmitter 23 generates error information indicating the first error, and transmits the error information to the communication device 10 (step S22). More specifically, the transmitter 23 acquires information indicating the first error by reading information about the synchronization error of the clocking unit 21 in time measurement preregistered in the auxiliary storage 43 in the communication device 20. The transmitter 23 may acquire information indicating the first error from other information sources.

The transmitter 23 may transmit the error information in a manner other than as requested by the communication device 10 as shown in FIG. 8. For example, when the communication devices 10 and 20 are connected and a sequence to establish the communication is started, the transmitter 23 may spontaneously transmit error information.

Subsequently, the setter 25 determines whether the setter 25 is instructed by the communication device 10 to set the suspension duration (step S23). When determining that the setter 25 has yet to receive the instruction from the communication device 10 (No in step S23), the setter 25 repeats the determination in step S23, and waits for the instruction from the communication device 10.

When determining that the setter 25 has received the instruction from the communication device 10 (Yes in step S23), the setter 25 sets the suspension duration in accordance with the instruction (step S24). The communicator 26 then repeats communications in each of the time divisions 51 and 52 (step S25).

Figure 9:
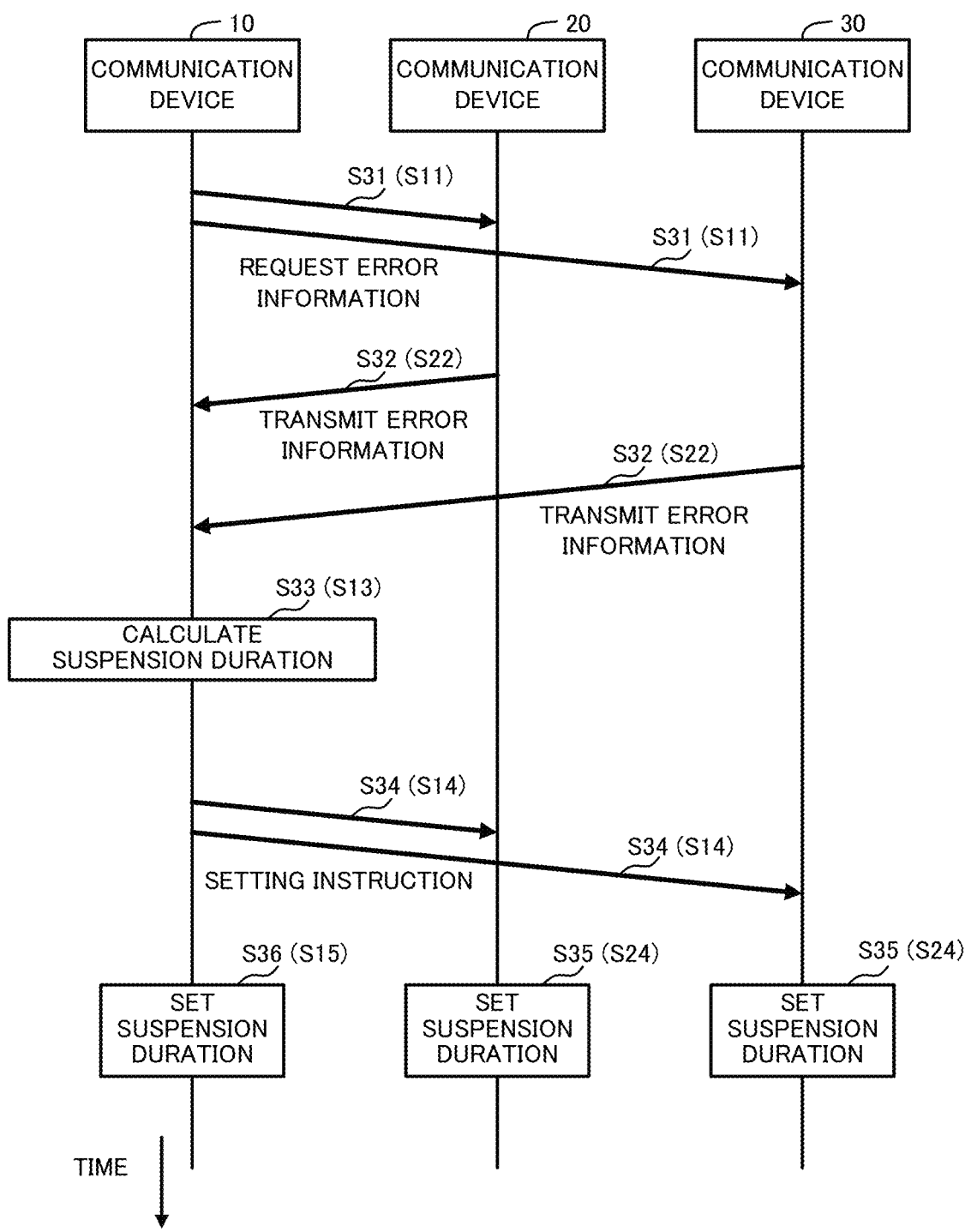
FIG. 9 is a diagram describing communications performed in the communication system according to Embodiment 1.

The sequence diagram in FIG. 9 shows an example of communications performed by the communication devices 10, 20, and 30. As shown in FIG. 9, the communication device 10 requests the error information from the communication devices 20 and 30 (step S31). Step S31 corresponds to step S11 in the specifying process shown in FIG. 7. Subsequently, the communication devices 20 and 30 transmit the error information in response to the request from the communication device 10 (step S32). Step S32 corresponds to step S22 in the setting process shown in FIG. 8.

Subsequently, the communication device 10 calculates a suspension duration based on the error information collected by the communication devices 20 and 30 (step S33). The suspension duration indicates the time length of suspension. Step S33 corresponds to step S13 in the specifying process shown in FIG. 7. Subsequently, the communication device 10 instructs the communication devices 20 and 30 to set the suspension duration calculated in step S33 (step S34). Step S34 corresponds to step S14 in the specifying process shown in FIG. 7.

The communication devices 20 and 30 set the suspension duration as instructed in step S34 (step S35). Step S35 corresponds to step S24 in the setting process shown in FIG. 8. The communication device 10 sets the suspension duration calculated in step S33 to the communication device 10 (step S36). Step S36 corresponds to step S15 in the specifying process shown in FIG. 7.

As described above, the acquirer 13 in the communication device 10 acquires the error information about the first errors of the communication devices 20 and 30 in time measurement, and the specifier 14 specifies the suspension duration for which the communication devices 20 and 30 suspend data transmission to the communication devices 20 and 30. The suspension duration specified by the specifying means is greater than or equal to a greater error of the first errors and the second error of the clocking means in time measurement. This structure eliminates an operation of the operator examining and setting the synchronization accuracy of the communication devices 20 and 30. This reduces the setting operation for devices with different synchronization accuracy.

Devices with higher synchronization accuracy normally take high initial costs whereas devices with lower synchronization accuracy take low initial costs. The synchronization accuracy can be synchronization performance that varies depending on the communication process or the manner of synchronization. Devices with various architectures designed by different manufactures are likely to be connected to an industrial network. In such a case, although multiple devices with different degrees of synchronization accuracy may be connected to a single network, the communication system 1000 can easily set an appropriate suspension duration with the devices.

The suspension duration specified by the specifier 14 is equal to the greatest error of the first errors and the second error. This structure can avoid lower communication efficiency resulting from greater suspension duration while minimizing communication abnormalities.

In the example described above, the suspension duration specified by the specifier 14 is greater than the greatest error of the first errors and the second error. When, for example, a new device with low synchronization accuracy is newly connected to a network through which the communication devices 10, 20, and 30 are communicating with one another, the suspension duration greater than the greatest error is expected to accommodate any error of the new device in time measurement. In other words, the suspension duration has preset tolerance for the synchronization accuracy of a new device for the shared time.

Embodiment 2

Embodiment 2 will now be described focusing on the differences from Embodiment 1. Like reference signs denote the same or like components in Embodiment 1. The present embodiment differs from Embodiment 1 in that the suspension duration is determined in accordance with a predetermined table.

Figure 10:
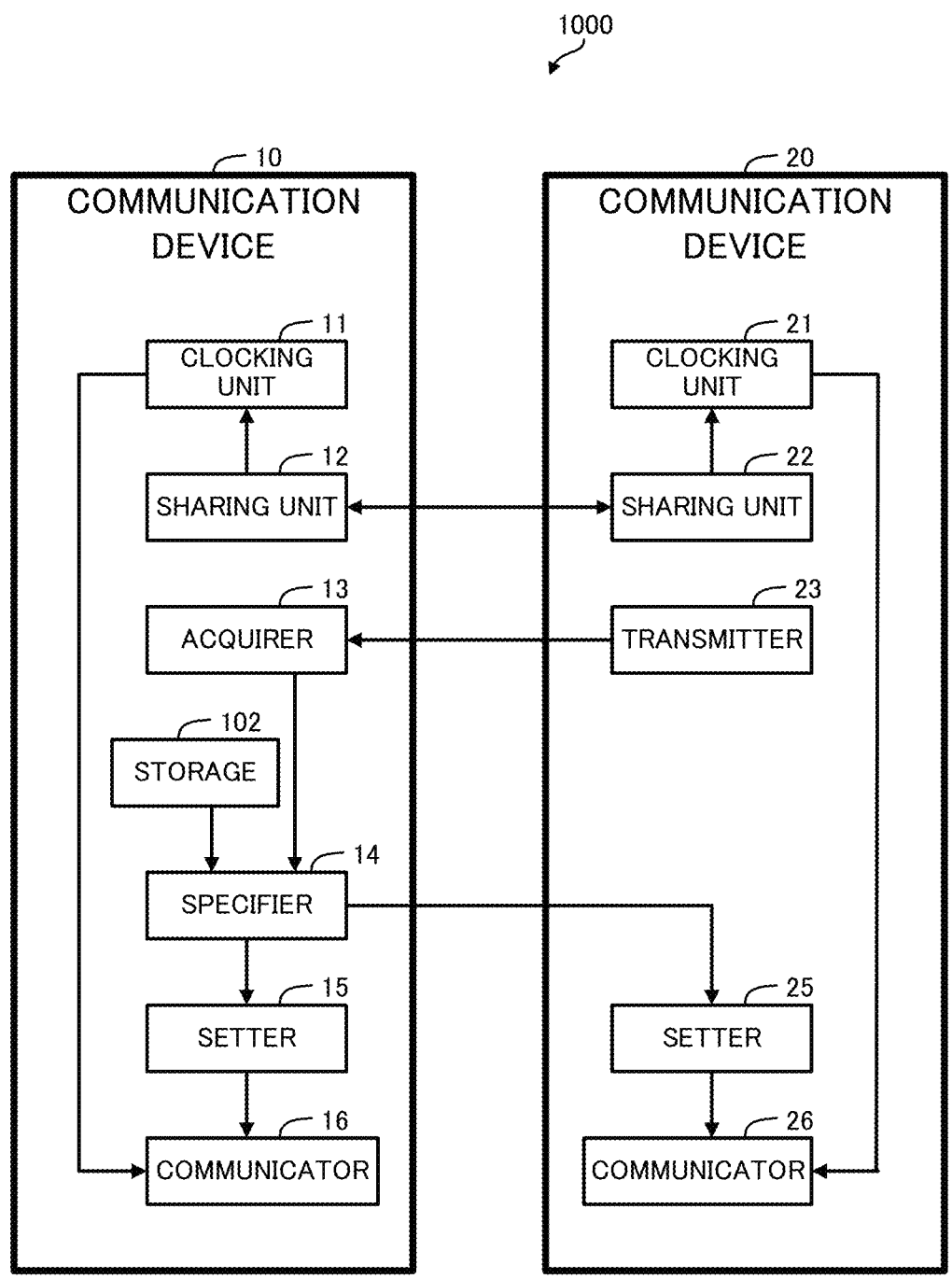
FIG. 10 is a functional block diagram of a communication device according to Embodiment 2.

As shown in FIG. 10, the communication device 10 according to the present embodiment includes a storage 102. The storage 102 is implemented by at least one of the main storage 42 or the auxiliary storage 43 in the communication device 10. The storage 102 stores association information associating an error range with a predefined value defining the suspension duration to be set with the error range.

FIG. 11 shows an example of association information stored in the storage 102. In the example shown in FIG. 11, the association information associating the range including the greatest error of the first errors and the second error with a value predefined as the suspension duration. The specifier 14 identifies the predefined values associated in the association information for the first errors and the second error and instructs the setters 15 and 25 to set the predefined values. In other words, the suspension duration specified to the setters 15 and 25 by the specifier 14 is equal to the predefined value associated with the range including the greater error of the first errors and the second error in the association information. The storage 102 in the communication device 10 corresponds to an example of storage means for storing association information associating an error range with a specified value specified in advance.

The communication device 10 according to the present embodiment can easily determine and set the suspension duration greater than the greatest error of the first errors and the second error by preparing the suspension duration as the association information in advance.

Embodiment 3

Embodiment 3 will now be described focusing on the differences from Embodiment 1. Like reference signs denote the same or like components in Embodiment 1. The present embodiment differs from Embodiment 1 in that the communication device 10 changes the suspension duration as appropriate in accordance with the communication state.

Figure 12:
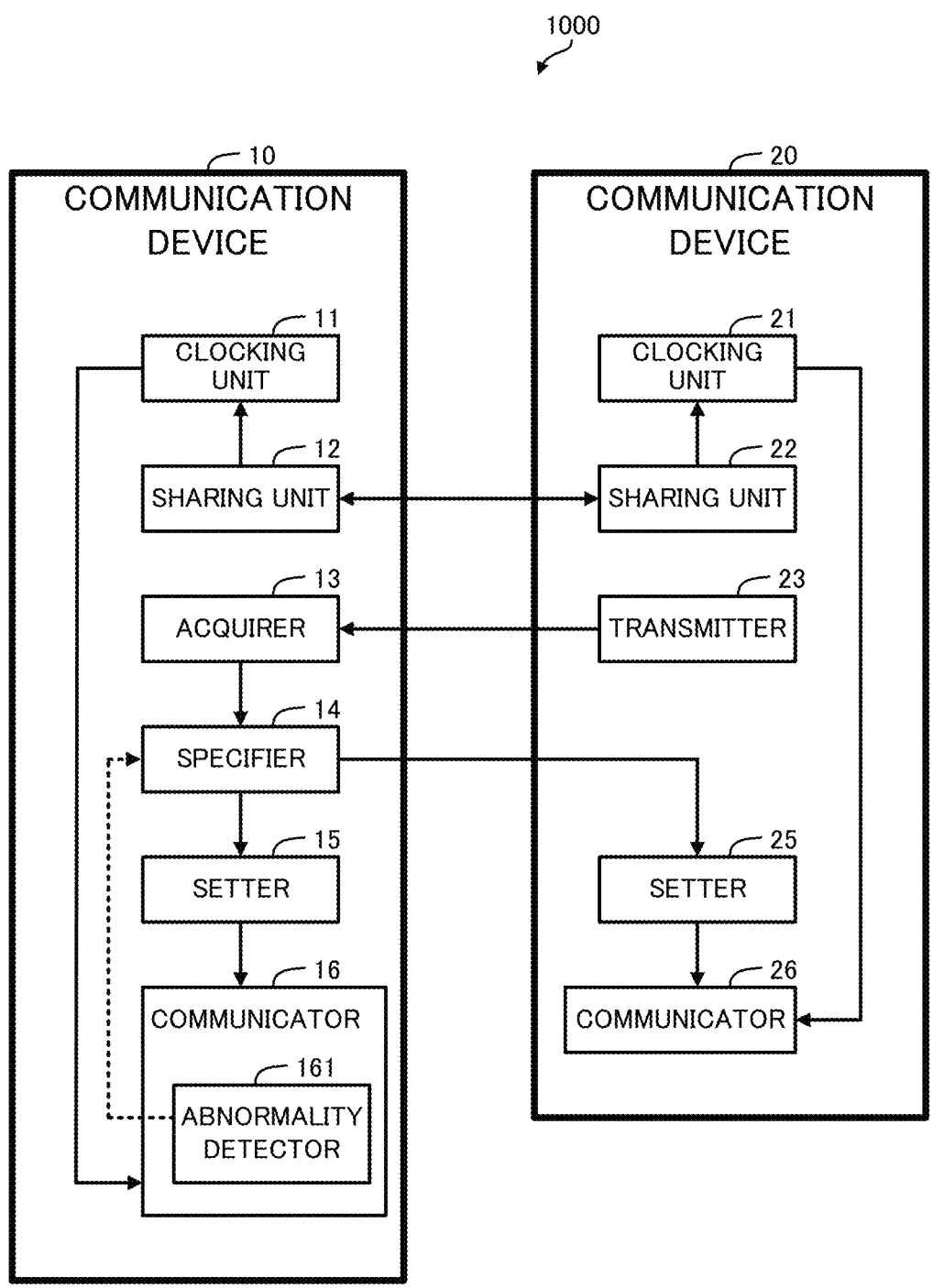
FIG. 12 is a functional block diagram of a communication device according to Embodiment 3.

As shown in FIG. 12, the communicator 16 in the communication device 10 according to the present embodiment includes an abnormality detector 161. In communications in each of the time divisions 51 and 52, the abnormality detector 161 detects any communication abnormality resulting from reception of data assigned with a cycle number different from a cycle number to be assigned with the data to be received. For example, when the suspension duration is erroneously set shorter, a communication abnormality as shown in FIG. 4 occurs. The suspension duration set based on the first errors and the second error can also cause a communication abnormality when an actual error of the communication devices 10, 20, and 30 in time measurement increases due to, for example, aging degradation. When such a communication abnormality occurs, the communicator 16 discards the received data to exclude the data from processing targets, and the abnormality detector 161 detects the communication abnormality. The abnormality detector 161 notifies the specifier 14 of the abnormality detection. The abnormality detector 161 in the communication device 10 corresponds to an example of abnormality detection means for detecting an abnormality in communication with another device.

When the abnormality detector 161 detects the communication abnormality, the specifier 14 instructs the setters 15 and 25 to set a suspension duration greater than the current suspension duration. For example, the specifier 14 may instruct the setters 15 and 25 to double the suspension duration, or may determine a new duration greater than the previously specified duration, and instruct the setters 15 and 25 to set the determined duration.

Figure 13:
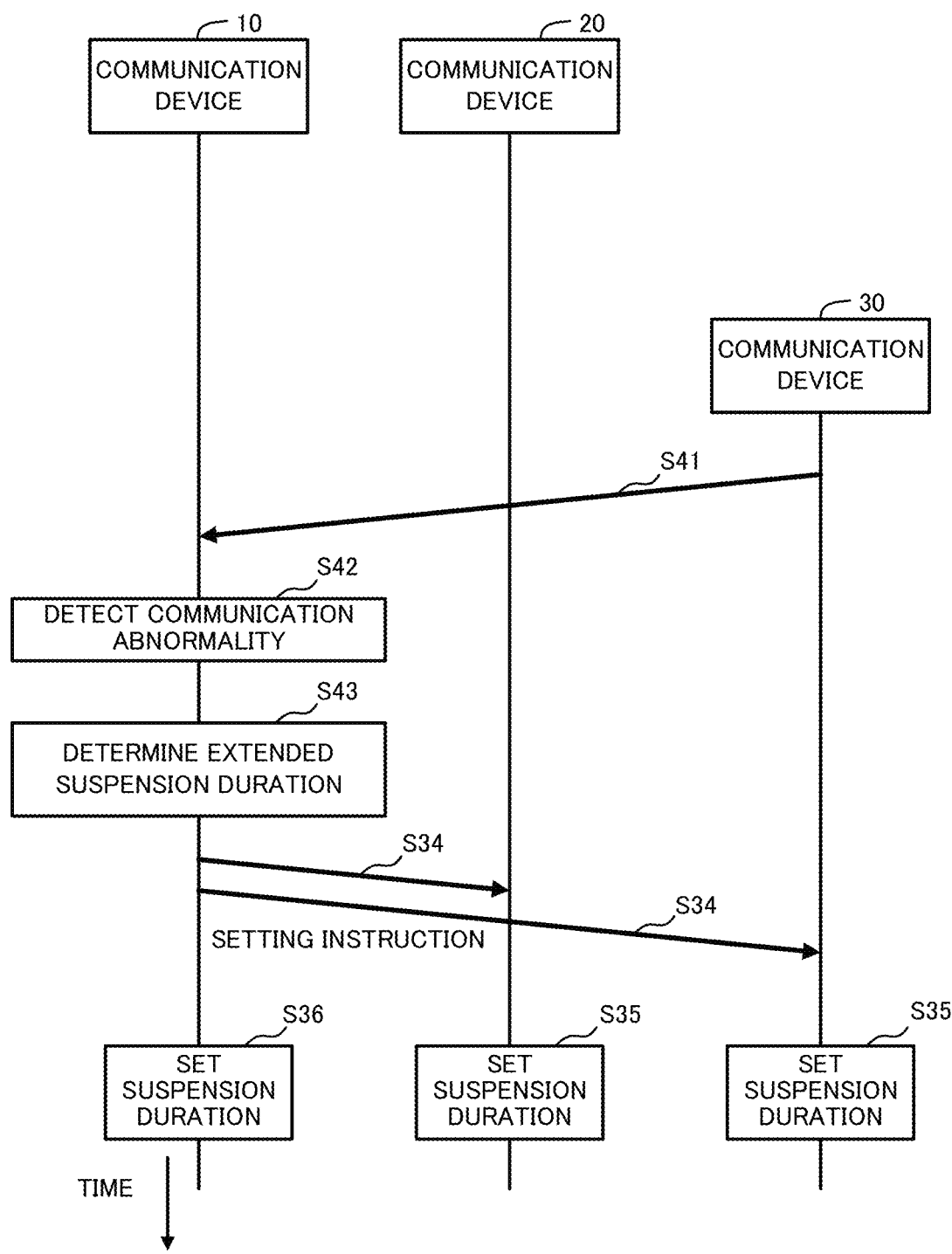
FIG. 13 is a diagram describing communications performed in a communication system according to Embodiment 3.

FIG. 13 shows example communications according to the present embodiment. In the example shown in FIG. 13, the communication device 30 with lower synchronization accuracy is added to the normal communication performed by the communication devices 10 and 20 in each time division. The communication device 30 transmits data assigned with a cycle number to the communication device 10 (step S41). Although the data from the communication device 30 may be normally received, the communication device 10 receiving data at least once from the communication device 30 with low synchronization accuracy detects a communication abnormality (step S42). The communication device 10 thus determines a suspension duration greater than the current suspension duration (step S43). Subsequently, the communication device 10 performs steps S34 and S36 in the same manner as in the example shown in FIG. 9, and the communication devices 20 and 30 perform step S35.

Thus, when the communication device 30 with low synchronization accuracy is newly connected to the network through which the communication devices 10 and 20 are communicating with each other, and causes a communication abnormality, the suspension duration is extended appropriately to correct such a communication abnormality.

Embodiment 4

Embodiment 4 will now be described focusing on the differences from Embodiment 1. Like reference signs denote the same or like components in Embodiment 1. The present embodiment differs from Embodiment 1 in that the communication device 10 detects a communication device 40 connected to or disconnected from a network, and changes the suspension duration in response to the detection.

Figure 14:
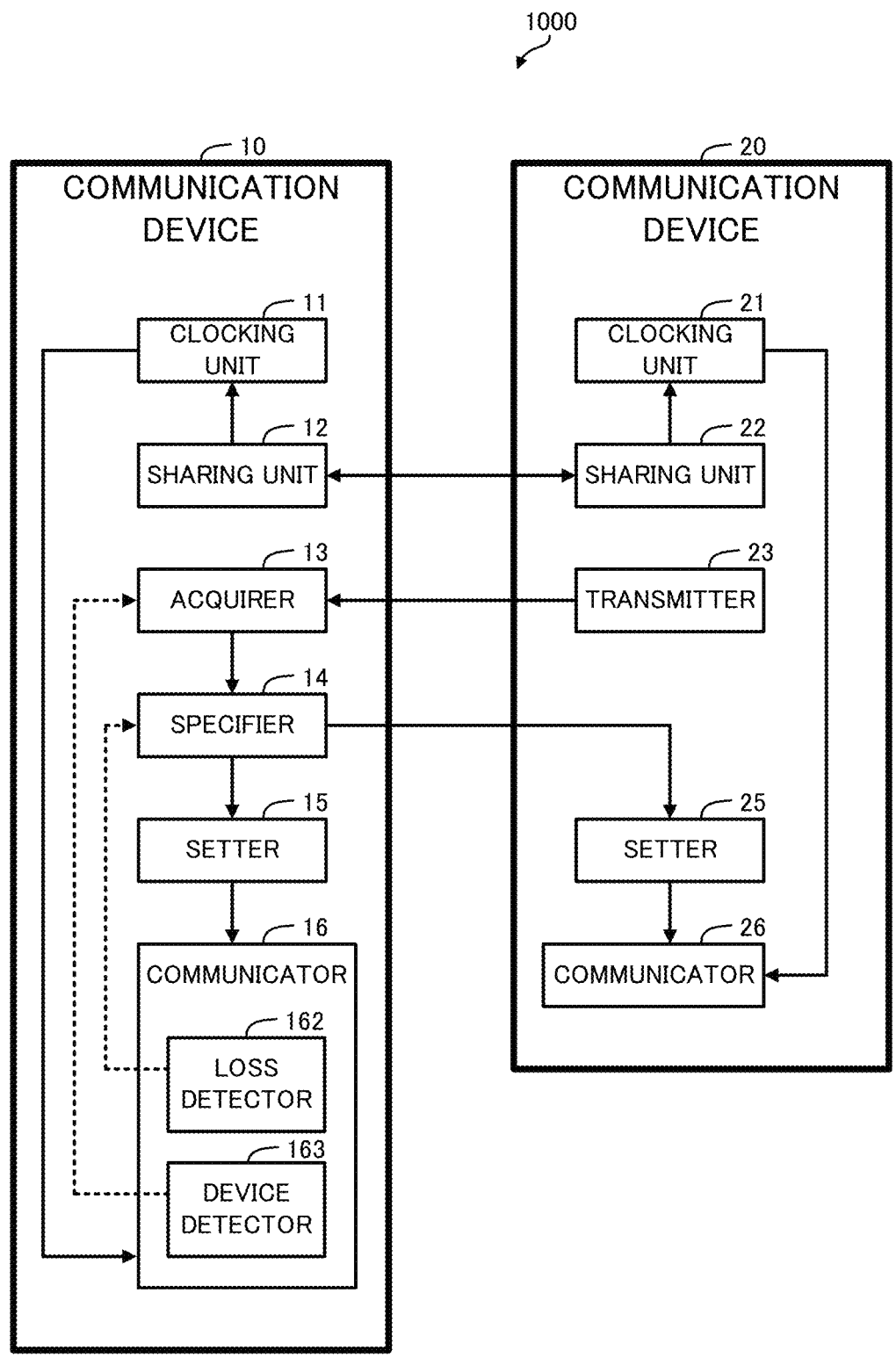
FIG. 14 is a functional block diagram of a communication device according to Embodiment 4.

As shown in FIG. 14, the communicator 16 in the communication device 10 according to the present embodiment includes a loss detector 162 that detects a communication device 40 disconnected from the network and for which communications have been lost, and a device detector 163 that detects a communication device 40 connected to the network to newly start communications with the communication device 10 in each time division.

The loss detector 162 detects communication loss by monitoring the transmission source of data that is to be periodically transmitted by the communication devices 40 on the network. For example, the loss detector 162 monitors a media access control (MAC) address for identifying the communication device 40 serving as the transmission source for data in the time slot TS1 transmitted in each time division in accordance with the synchronous protocol and data in cyclic communications in the time slot TS2. The loss detector 162 also determines whether the reception of data assigned with the MAC address received in the past has been lost at least once. When the loss detector 162 determines that the data reception has been lost, the loss detector 162 detects communication loss with the communication device 40 corresponding to the MAC address. The loss detector 162 notifies the specifier 14 of a detection result including information identifying the lost device for which communications have been lost. The loss detector 162 in the communication device 10 corresponds to an example of loss detection means for detecting, from the multiple communication devices 40, a lost device for which communications with the communication device 10 have been lost.

Similarly to the loss detector 162, the device detector 163 detects a new communication device 40 connected to the network by monitoring the MAC address of the received data. For example, the device detector 163 determines whether data assigned with a MAC address that has not been received in the past is newly received. When the device detector 163 determines reception of data from a new communication device 40, the device detector 163 detects addition of the new communication device 40. The device detector 163 notifies the acquirer 13 of the detection result including information identifying the new communication device 40. The device detector 163 in the communication device 10 corresponds to an example of device detection means for detecting a new communication device 40 that communicates with the communication device 10 in each time division.

When the device detector 163 detects a new communication device 40, the acquirer 13 acquires error information indicating a first error of the new communication device 40 in measuring the shared time from the new communication device 40, and transmits the acquired error information to the specifier 14. When the first error of the new communication device 40 in time measurement is greater than the current suspension duration specified to the communication devices 20 and 30, the specifier 14 specifies a suspension duration greater than the current suspension duration to the setters 15 and 25. This allows the setters 15 and 25 to set the suspension duration corresponding to the synchronization accuracy of the communication device 40 newly connected to the network.

When the loss detector 162 detects a lost device, the specifier 14 determines whether the suspension duration can be shortened based on the synchronization accuracy of the communication devices 40 excluding the lost device. When determining that the suspension duration can be shortened, the specifier 14 instructs the setters 15 and 25 to shorten the suspension duration. More specifically, when the first error of the lost device in time measurement is the greatest error of the errors in time measurement of the communication devices 40 performing communications before the communication loss, the specifier 14 specifies the suspension duration less than the current suspension duration to the multiple communication devices 40 excluding the lost device.

Figure 15:
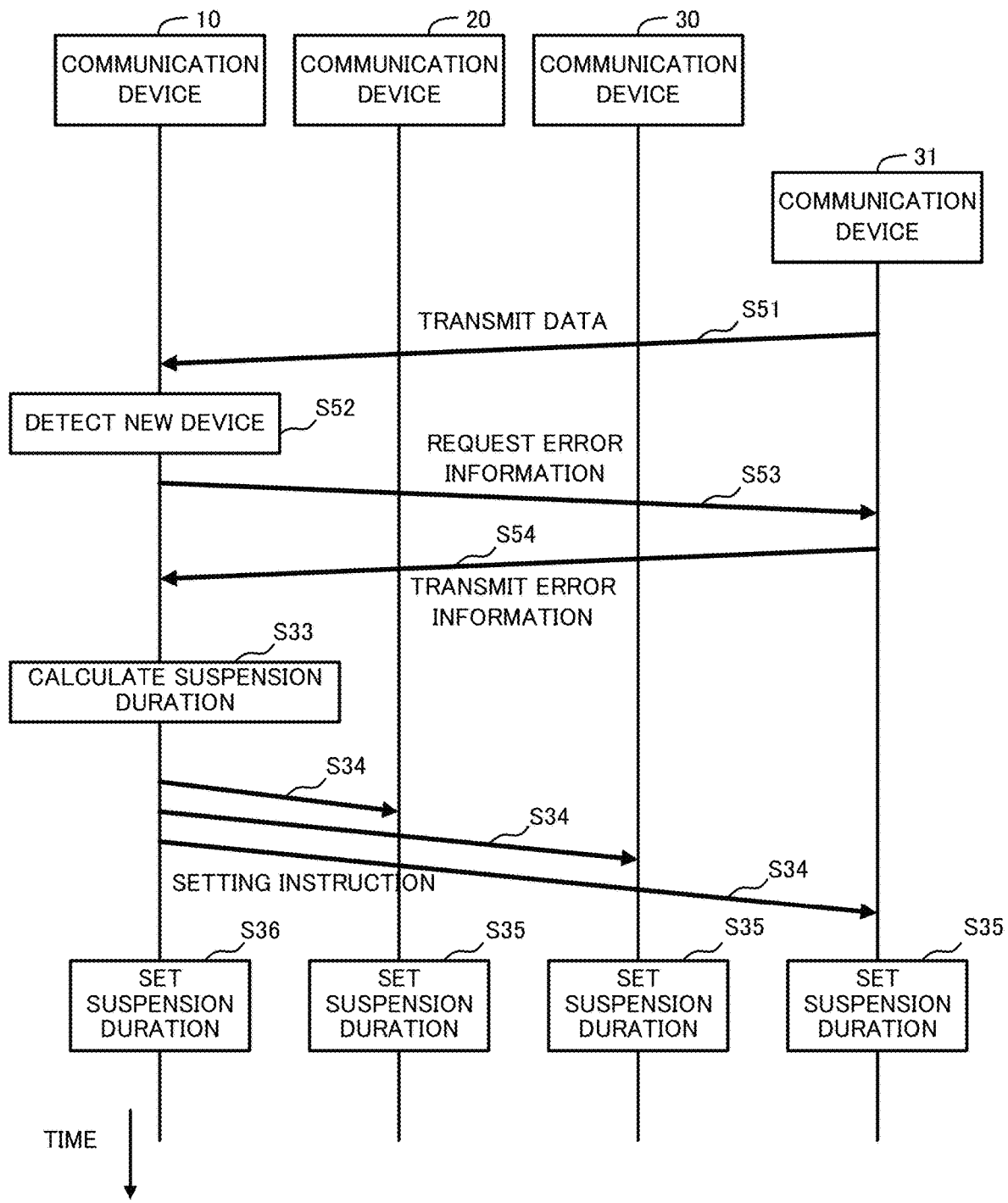
FIG. 15 is a diagram describing first communications performed in a communication system according to Embodiment 4.

FIG. 15 shows communications performed when a new communication device 31 having the same structure as the communication devices 20 and 30 is connected to the network through which the communication devices 10, 20, and 30 are communicating with one another normally. As shown in FIG. 15, when the communication device 31 transmits data to the communication device 10 (step S51), the communication device 10 detects the new communication device 31 (step S52). The communication device 10 requests error information from the detected communication device 31 (step S53), and the communication device 31 transmits the error information (step S54). The communication device 10 then performs steps S33, S34, and S36 in the same manner as in the example in FIG. 9, and the communication device 20 performs step S35 in the same manner as in FIG. 9. In step S33, the communication device 10 calculates the suspension duration based on an error including the first error of the communication device 31. The communication device 31 performs step S35 in the same manner as the communication devices 20 and 30.

In the example shown in FIG. 15, the suspension duration is recalculated and set independently of the first error of the communication device 31 in time measurement. However, when acquisition of the suspension duration in step S33 results in unnecessity to change the suspension duration from the current value, the communication device 10 may skip providing setting instructions to the setter 15 in the communication device 10 and the setters 25 in the communication devices 20 and 30. When the first error of the communication device 31 is greater than any of the errors of the existing communication devices 10, 20, and 30, the suspension duration is to be extended and reset with all the communication devices 40. For example, when the errors of the communication devices 10, 20, and 30 are respectively 5, 2, and 20 microseconds, and the error of the communication device 31 is 25 microseconds, the suspension duration is reset to 25 microseconds.

Figure 16:
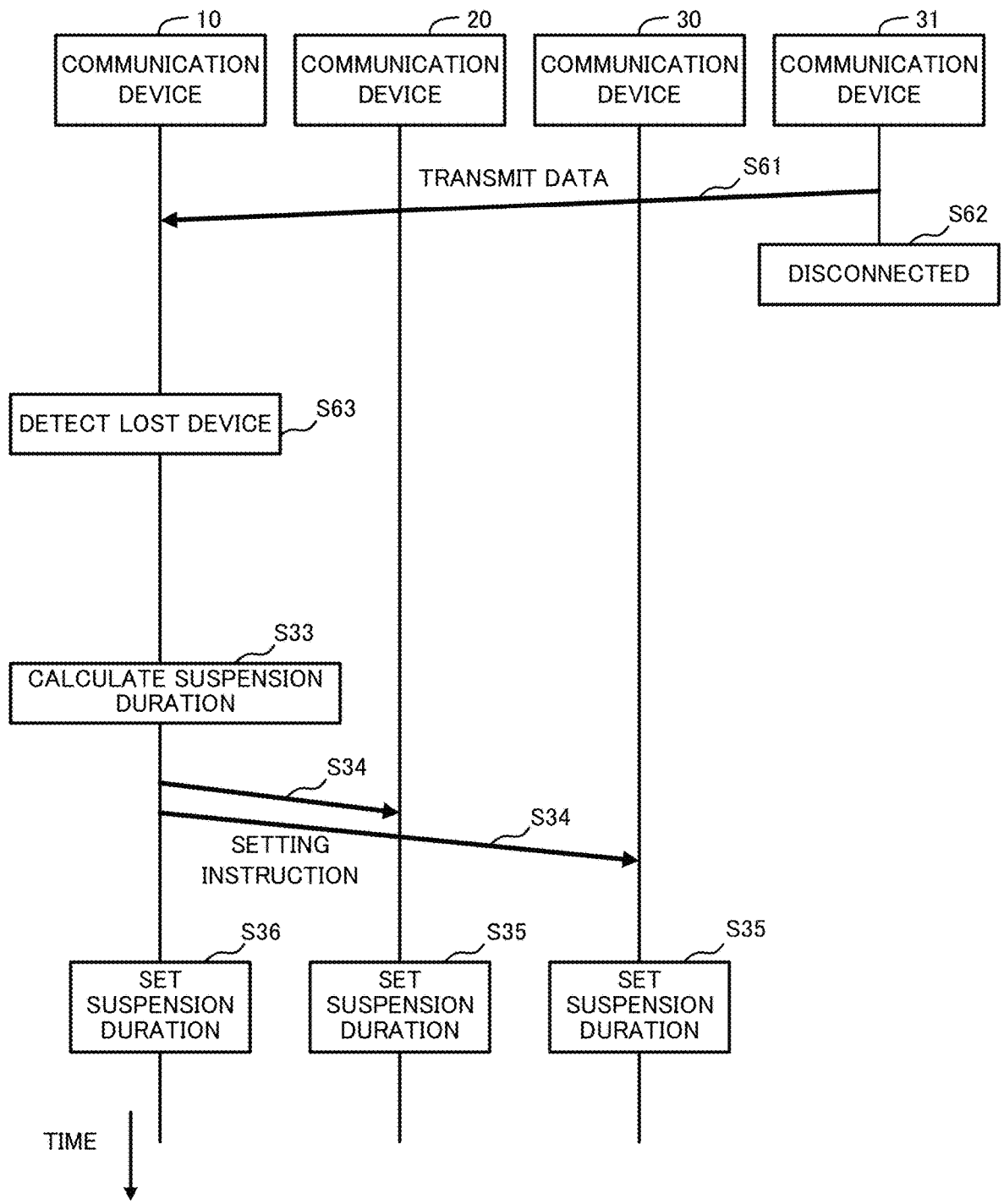
FIG. 16 is a diagram describing second communications performed in the communication system according to Embodiment 4.

FIG. 16 shows communications performed when the communication device 31 is disconnected from the network through which the communication devices 10, 20, 30, and 31 are communicating with one another normally. As shown in FIG. 16, when the communication device 31 transmits data to the communication device 10 (step S61) and then is disconnected from the network (step S62), the communication device 10 detects the communication device 31 as a lost device based on loss of data to be received from the communication device 31 (step S63). The communication device 10 then performs steps S33, S34, and S36 in the same manner as in the example in FIG. 9, and the communication devices 20 and 30 perform step S35 in the same manner as in the example in FIG. 9. In step S33, the communication device 10 calculates the suspension duration based on the errors excluding the first error of the lost device.

In the example shown in FIG. 16, the suspension duration is recalculated and set independently of the first error of the communication device 31. However, when acquisition of the suspension duration acquired in step S33 results in unnecessity to change the suspension duration from the current value, the communication device 10 may skip steps S34 and S36. However, when the first error of the communication device 31 is a single greatest error of the errors of the communication devices 10, 20, 30, and 31, the suspension duration may be shortened. Thus, the suspension duration may be shortened to improve the communication efficiency. For example, when the errors of the communication devices 10, 20, 30, and 31 are respectively 5, 2, 20, and 25 microseconds, the suspension duration may be reset to 20 microseconds when the communication device 31 is disconnected from the network.

As described above, the communication device 10 according to the present embodiment detects communications with the new communication device 40 through a network and communication loss to appropriately change the suspension duration in accordance with the communication devices 40 connected to the network. Thus, the communication efficiency can be improved.

Although one or more embodiments of the present disclosure have been described above, the present disclosure is not limited to the above embodiments.

For example, in the above embodiments, error information is described as information directly indicating the synchronization accuracy corresponding to errors. However, the error information is not limited to the above. For example, the error information may be information indicating one of labels including high, intermediate, and low corresponding to synchronization accuracy. The specifier 14 may determine the suspension duration in accordance with the label. The error information may be information indicating the source of the information indicating errors. For example, the transmitter 23 in the communication device 20 transmits, to the communication device 10, an address of a server operated by the manufacturer of the communication device 20 together with the model number of the communication device 20 as error information, and the acquirer 13 in the communication device 10 may acquire information indicating the error of the communication device 20 by querying the server for the synchronization accuracy corresponding to the model number. The specifier 14 may acquire the clock rate of the processor 41 in the communication device 20 as information about the errors, and calculate the errors of the communication device 20 based on the clock rate.

The communication system 1000 may include any number of communication devices 40 other than in the above embodiments. The number of communication devices 40 may be changed as appropriate.

In the above embodiments, the suspension duration is set at the start and at the end of each of the time divisions 51 and 52, but may be set differently. For example, when no communication is performed in the last time slot TS0 included in each of the time divisions 51 and 52, the suspension duration may not be set at the end of each of the time divisions 51 and 52, with the suspension duration at the start alone being set. Similarly, when no communication is performed in the first time slot TS1, the suspension duration at the end alone may be set.

The functions of the communication device 40 can be implemented by either dedicated hardware or a normal computer system.

For example, the program P1 executed by the processor 41 may be stored in a non-transitory computer-readable recording medium, distributed, and installed on a computer to implement a device that performs the above processes. Examples of such a non-transitory recording medium include a flexible disc, a compact disc read-only memory (CD-ROM), a digital versatile disc (DVD), and a magneto-optical (MO) disk (MO).

The program P1 may be stored in a disc device included in a server device on a communication network such as the Internet, and may be, for example, superimposed on a carrier wave and downloaded to a computer.

The above processes may also be performed by launching and executing the program P1 while transferring the program P1 through a communication network.

The above processes may also be performed by entirely or partially executing the program P1 on the server device, and executing the program while a computer is transmitting and receiving information about the processes through a communication network.

In the system with the above functions implementable partly by the operating system (OS) or through cooperation between the OS and applications, portions executable by applications other than the OS may be stored in a non-transitory recording medium that may be distributed or may be downloaded to the computer.

Means for implementing the functions of the communication device 40 is not limited to software, and may be partially or entirely implemented by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to a communication system in which devices communicate with each other in each of time divisions defined by time shared between the devices.

REFERENCE SIGNS LIST

1000 Communication system
10, 20, 30, 31, 40 Communication device
11, 21 Clocking unit
12, 22 Sharing unit
13 Acquirer
14 Specifier
15, 25 Setter
16, 26 Communicator
161 Abnormality detector
162 Loss detector
163 Device detector
102 Storage
23 Transmitter
41 Processor
42 Main storage
43 Auxiliary storage
44 Clock
45 Input device
46 Output device
47 Communicator
49 Internal bus
51, 52 Time division
401, 402 Industrial network
P1 Program

The invention claimed is:

1. A communication device for communicating with another device in each of time divisions defined by shared time that is shared with the another device, the communication device comprising:
processing circuitry
to measure the shared time;
to acquire, from the another device, error information about a first error of the another device in measuring the shared time; and
to specify, to the another device, a suspension duration at least at a start or at an end of each of the time divisions, the suspension duration being a duration for which the another device suspends data transmission, wherein
the specified suspension duration is greater than or equal to a greater error of the first error and a second error that is an error of the processing circuitry in time measurement.

2. The communication device according to claim 1, wherein
the processing circuitry acquires the error information indicating the first error from the another device, and
the specified suspension duration is equal to the greater error of the first error and the second error.

3. The communication device according to claim 1, further comprising:
a storage to store association information associating an error range with a predefined value, wherein
the processing circuitry acquires the error information indicating the first error from the another device, and
the specified suspension duration is equal to the predefined value associated with a range including the greater error of the first error and the second error in the association information.

4. The communication device according to claim 1, wherein
the processing circuitry detects an abnormality in communication with the another device, and
when the abnormality is detected, the processing circuitry specifies, to the another device, a suspension duration greater than the suspension duration currently specified.

5. The communication device according to claim 1, wherein
the processing circuitry detects a new device configured to communicate with the communication device in each of the time divisions,
when the new device is detected, the processing circuitry acquires, from the new device, the error information about the first error of the new device in measuring the shared time, and
when the first error of the new device in time measurement is greater than the suspension duration specified to the another device, the processing circuitry specifies, to the another device, a suspension duration greater than the suspension duration currently specified.

6. The communication device according to claim 1, wherein
the communication device communicates with a plurality of other devices,
the processing circuitry specifies the suspension duration to the plurality of other devices, and
the specified suspension duration is greater than or equal to a greatest error of the first errors of the plurality of other devices in time measurement and the second error.

7. The communication device according to claim 1, wherein
the processing circuitry detects, from the plurality of other devices, a lost device for which communications with the communication device is lost, and
when the first error of the lost device in time measurement is a greatest error of the first errors of the plurality of other devices in time measurement, the processing circuitry specifies, to the plurality of other devices excluding the lost device, a suspension duration less than the suspension duration currently specified.

8. A communication system, comprising:
a first communication device; and
a second communication device to communicate with the first communication device in each of time divisions defined by shared time that is shared with the first communication device,
the second communication device including
first processing circuitry
to measure the shared time,
to acquire, from the first communication device, error information about a first error of the first communication device in measuring the shared time, and
to specify, to the first communication device, a suspension duration at least at a start or at an end of each of the time divisions, the suspension duration being a duration for which the first communication device suspends data transmission, the specified suspension duration being greater than or equal to a greater error of the first error and a second error that is an error of the processing circuitry in time measurement, the first communication device including second processing circuitry to transmit the error information to the second communication device, and to set the specified suspension duration.

9. A non-transitory computer-readable recording medium including a program to be executed by a computer to communicate with a device in each of time divisions defined by shared time that is shared with the device, the program causing the computer to perform operations comprising:

specifying, to the device, a suspension duration at least at a start or at an end of each of the time divisions, the suspension duration being a duration for which the device suspends data transmission, wherein the specified suspension duration is greater than or equal to a greater error of a first error of the device in measuring the shared time and a second error of the computer in measuring the shared time.

\* \* \* \* \*